United States Patent [19]

Schaffer

[11] 4,418,962

[45] Dec. 6, 1983

[54] SPOKED WHEEL COVERS

[76] Inventor: Clarence S. Schaffer, Rte. 1, Box 696, Groveland, Fla. 32736

[21] Appl. No.: 307,730

[22] Filed: Oct. 2, 1981

[51] Int. Cl.³ .............................................. B60B 7/00
[52] U.S. Cl. ............................ 301/37 P; 301/37 SA; 301/37 H
[58] Field of Search .............. 301/37 R, 37 SA, 37 P, 301/37 H, 37 R

[56] References Cited

U.S. PATENT DOCUMENTS

| | | | |
|---|---|---|---|
| 1,765,858 | 6/1930 | Anderson | 301/37 H |
| 3,317,246 | 5/1967 | Wester | 301/37 SA |
| 3,579,408 | 5/1971 | Dowhan | 301/37 SA |
| 3,602,550 | 8/1971 | Patane | 301/37 SA |
| 3,847,443 | 11/1974 | Laurion | 301/37 SA |
| 3,894,775 | 7/1975 | Christoph et al. | 301/37 P |
| 3,950,076 | 4/1976 | Carlson | 301/37 SA |

*Primary Examiner*—H. Grant Skaggs
*Attorney, Agent, or Firm*—William M. Hobby, III

[57] ABSTRACT

A spoked wheel cover apparatus uses a pair of covers sized to cover each side of the spokes on a spoked wheel. Each cover has a center opening for the axle of the wheel to pass through. Covers are attached with screws, screwed into nuts, which may be formed in one of the covers and may have spacers between the covers. Alternatively, the covers can be attached with molded snap fastener portions on each cover. A bent valve stem extension extends the valve through an opening in one cover. Both covers may have reflective, decorative, or phosphorescent coatings.

7 Claims, 6 Drawing Figures

U.S. Patent     Dec. 6, 1983     4,418,962
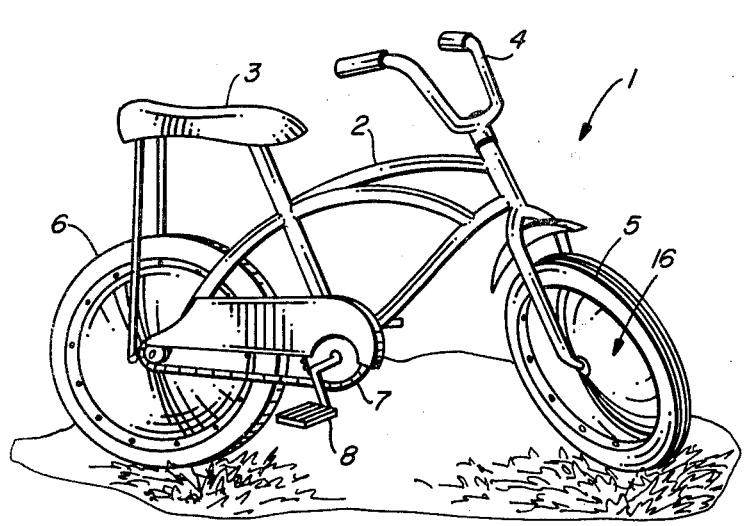
FIG-1
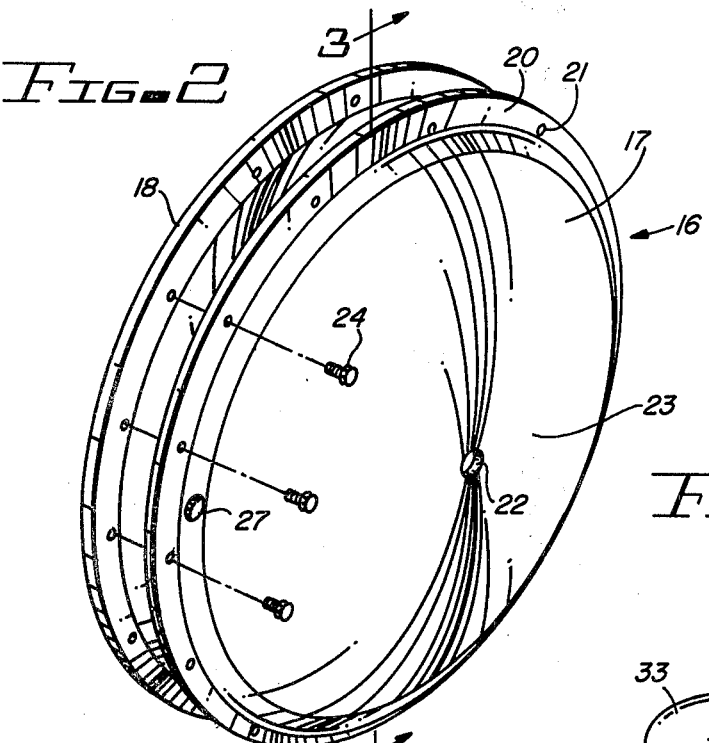
FIG-2
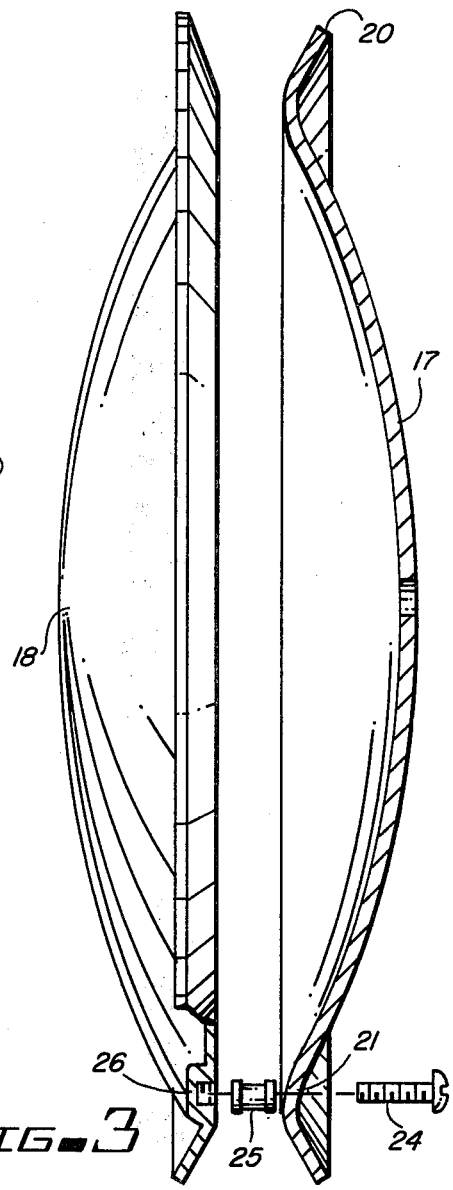
FIG-3
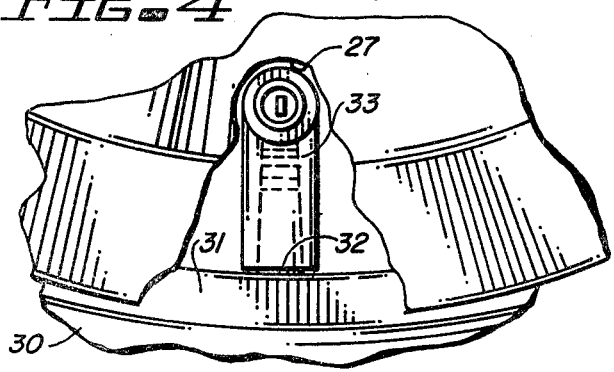
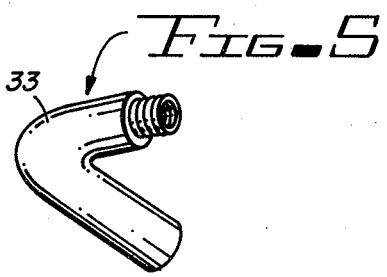
FIG-5
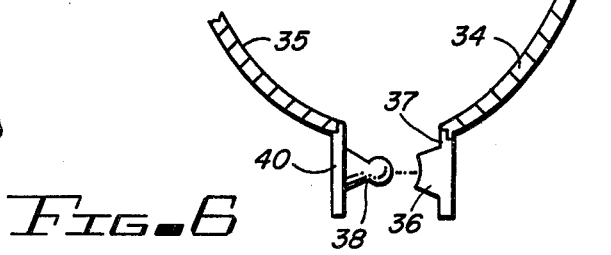
FIG-6

SPOKED WHEEL COVERS

BACKGROUND OF THE INVENTION

This invention relates to spoked wheel covers and especially to spoked wheel covers to cover the spokes on bicycles, tricycles, and the like, for both safety and decoration.

In the past, it has been common to provide hubcaps on automobiles and trucks, and these are primarily for decorative purposes to cover up a portion of the wheel and the hub protruding through the wheel. It has also been common to provide hubcaps to cover the ends of axles for wheels on lawnmowers, early spoked automobile wheels, as well as on bicycles, tricycles, and the like. The following U.S. Pat. Nos. illustrate the use of hubcaps for bicycles, tricycles, or similar vehicles: 1,878,528 to H. L. Draeft; 2,151,485 to R. Pawsat: 2,225,098 to C. W. Hedstrom; 3,220,776 to H. Golden; and 3,924,898 to C. L. Kain.

The present invention, on the other hand, is directed towards a cover, not of the axle but of the entire spoked portion of the wheel, allowing the axle to protrude through the cover so that the cover fits behind the frame portion holding the bicycle wheel. The cover advantageously prevents children or adults from getting a foot caught in the spoke and simultaneously be provided with reflective material, phosphorescent material, or decorative designs more readily visible to an automobile than a spoked wheel, while providing aesthetically more pleasing appearance to the bicycle or tricycle.

SUMMARY OF THE INVENTION

The present invention relates to a spoked wheel cover for a spoked wheel such as found on bicycles, tricycles, or the like, to prevent accidents and to make the vehicle more visible, as well as more decorative. A pair of covers are sized to cover each side of the spokes on a spoked wheel and have a center opening therein for the axle to extend through. The covers are attached together by fasteners such as screws threaded through openings in one cover into nuts formed on the other cover, and may be provided with a spacer between the covers to space the covers over the spokes. The spacer may have a bore therethrough for the screw to pass through. An alternate embodiment allows each side of a snap fastener to be molded into the perimeter portion of the covers so that the covers can be snapped one onto the other over the spokes. An opening is also provided in one of the covers for a valve stem for filling the tire and a bent valve stem extension may be attached to the wheel valve stem to extend the stem through the wheel covers. A decorative coating may be applied to the wheel covers, such as a reflective or phosphorescent coating, which is more readily visible at night or in low light conditions by vehicles shining their lights on the covers. The coating may also be of decorative designs to make the bicycle more attractive.

BRIEF DESCRIPTION OF THE DRAWINGS

Other objects, features and advantages of the present invention will be apparent from the written description and the drawings, in which:

FIG. 1 is a perspective view of a bicycle having spoked wheel covers in accordance with the present invention attached thereto;

FIG. 2 is an exploded view of a pair of spoked wheel covers;

FIG. 3 is a sectional view taken on the line 3—3 of FIG. 2;

FIG. 4 is a cutaway elevation showing the valve stem extension attached to the wheel;

FIG. 5 is a perspective view of the bent valve stem; and

FIG. 6 is a cutaway sectional view of an alternate embodiment for attaching the covers together.

DESCRIPTION OF THE PREFERRED EMBODIMENTS

Referring to FIGS. 1 through 6 of the drawings, a bicycle 1 is shown having a frame 2, a seat 3, handle bars 4, front wheel 5 and a rear wheel 6. The wheels are driven by a sprocket and chain 7 driven by pedals 8. The front and rear wheels 4 and 5 each have a spoked wheel cover 16 thereon. Spoked wheel covers 16 include a right hand cover 17 and a left hand cover 18 formed in a curved or dish shaped with a flattened flange rim 20 therearound. The flanged rim has a plurality of openings 21 therein in cover 17 and a center opening 22 is in the center of each cover 17 and 18 for an axle to extend through. A curved surface 23 has a decorative coating thereon, such as a reflective or phosphorescent coating easily visible in low light conditions or at night when lights shine upon the cover and may have a decorative design placed thereon using reflective materials to form the design. A plurality of screws 24 are adapted to fit through each opening 21 and through a spacer member 25 and be threaded into a nut 26 having internal threads therein. The nut 26 is formed into the left hand cover 18, but it will be clear that a separate nut could be utilized without departing from the spirit and scope of the invention. However, a nut formed into the cover 18 presents a snag proof surface on either side of the covers. The right hand cover 17 has an opening 27 formed therein for the passage of a valve stem extension. The tire of the vehicle 30 has a wheel 31 having valve stem 32 extending therethrough to which a bent valve stem 33 may be bent at 90° for passage through the opening 27 so that the tire may be filled with air without having to remove the covers.

An alternate embodiment shown in FIG. 6 has a cover 34 and a cover 35 with cover 34 having a female snap portion 36 formed in the molding process directly to the flanged perimeter 37 while the cover 35 has a male snap portion 38 formed to a flanged perimeter portion 40. This allows the cover to be made in one molding operation, placed over the spoked wheels of the bicycle or tricycle with the snap fastener portion 36 and 38 aligned, and then to be snapped together. Advantageously, the snap portions 36 and 38 form the spacing between the covers eliminating additional spacers. In addition, the molded fastener portions 36 and 38 can be utilized in conjunction with screws to increase the strength of the attachment between the covers.

It should be clear at this point that spoked wheel covers have been provided which can be readily attached to bicycles by the owner, which provide safety features of greater visibility of the bicycle while preventing body limbs of children from getting caught in the spokes and causing great damage. However, the invention is not to be construed as limited to the forms shown, which are to be considered illustrative rather than restrictive.

I claim:

1. A spoked wheel cover comprising in combination: a pair of covers sized to cover each side of the spokes on a spoked wheel and having a center axle opening therein for an axle to extend through; attachment means for attaching said covers together through said spokes, said attaching means having a plurality of fasteners extending through the spokes to attach one cover to the other, said attachment means including a plurality of snap fastener portions formed on the perimeter flange of one of said pair of covers and a plurality of mating snap portions formed on the other of said pair of covers perimeter flange, one of said pair of covers being formed of a molded polymer and the snap portions formed thereon being molded polymer male snap portions and the other of said pair of covers being formed of a molded polymer and the snap portions thereon being molded female snap portions; and spacer means for spacing one cover from the other, said spacer means formed into the snap portions formed on one said covers, and one cover of said pair of covers having an opening for a valve stem extension to extend through and a bent valve extension to allow the extension to fit into the opening in said spoked wheel cover, whereby the spokes on a spoked wheel can be covered.

2. A spoked wheel cover in accordance with claim 1, in which each cover has a perimeter flange formed thereon.

3. A spoked wheel cover in accordance with claim 2, in which said perimeter flange on one of said pair of covers has a plurality of openings therein and said attachment means includes a plurality of screws for passing through the openings in the perimeter flange and attaching to nuts adjacent the other of said pair of covers.

4. A spoked wheel cover in accordance with claim 3, in which attachment means includes a plurality of nuts formed into the perimeter flange area of said other of said pair of covers.

5. A spoked wheel cover in accordance with claim 1, in which each said spoked wheel cover has a reflective surface formed thereon.

6. A spoked wheel cover in accordance with claim 1, in which a phosphorescent coating is formed on each wheel cover.

7. A spoked wheel cover in accordance with claim 1, in which each pair of covers has a decorative coating thereon.

* * * * *